US008902992B2

(12) United States Patent
Goetting (10) Patent No.: US 8,902,992 B2
(45) Date of Patent: Dec. 2, 2014

(54) DECODER FOR SELECTIVELY DECODING PREDETERMINED DATA UNITS FROM A CODED BIT STREAM

(75) Inventor: Detlef Goetting, Hamburg (DE)

(73) Assignee: Entropic Communications, Inc., San Diego, CA (US)

( * ) Notice: Subject to any disclaimer, the term of this patent is extended or adjusted under 35 U.S.C. 154(b) by 261 days.

(21) Appl. No.: 12/594,312

(22) PCT Filed: Mar. 31, 2008

(86) PCT No.: PCT/IB2008/051195
§ 371 (c)(1),
(2), (4) Date: Oct. 1, 2009

(87) PCT Pub. No.: WO2008/122913
PCT Pub. Date: Oct. 16, 2008

(65) Prior Publication Data
US 2010/0118947 A1 May 13, 2010

(30) Foreign Application Priority Data
Apr. 4, 2007 (EP) .................................. 071056105

(51) Int. Cl.
*H04N 7/12* (2006.01)
*H04N 11/02* (2006.01)
*H04N 11/04* (2006.01)
*H04N 19/162* (2014.01)
*H04N 19/132* (2014.01)
*H04N 19/44* (2014.01)
*H04N 19/17* (2014.01)
*H04N 19/60* (2014.01)

(52) U.S. Cl.
CPC ..... *H04N 19/00775* (2013.01); *H04N 19/0023* (2013.01); *H04N 19/00127* (2013.01); *H04N 19/00533* (2013.01); *H04N 19/0026* (2013.01)
USPC ............ 375/240.25; 375/240.12; 375/240.18

(58) Field of Classification Search
None
See application file for complete search history.

(56) References Cited

U.S. PATENT DOCUMENTS 6,941,019 B1 9/2005 Mitchell et al.
7,480,418 B2 * 1/2009 Niemi et al. .................. 382/246
(Continued)

FOREIGN PATENT DOCUMENTS

EP 0810552 A 12/1997
EP 1037165 A 9/2000
(Continued)

OTHER PUBLICATIONS

International Search Report for appln. PCT/IB2008/051195 (counterpart to subject application).

*Primary Examiner* — Joseph Ustaris
*Assistant Examiner* — Kevin McInnish
(74) *Attorney, Agent, or Firm* — Richard Bachand; Duane Morris LLP (57) ABSTRACT

A decoder (100) is disclosed, which selectively reconstructs at least one predetermined data unit out of a coded bit stream (c). The decoder (100) includes a parsing unit (120) to search and parse unambiguous information (up) characterizing the at least one predetermined data unit uniquely. Next, the parsing unit (120) provides this parsed information (up) either directly to a decoding unit (130) or to a look-up table (140) such that the decoding unit (130) could reconstruct the predetermined data unit directly out of the coded bit stream (c) based on the parsed information (up) without decoding and reconstructing the coded bit stream (c) completely. Optionally, a specification unit (110) provides an start position (us) of the coded bit stream (c) to the parsing unit (120) used for starting the search. Therewith, data traffic, computation time and memory resources could be saved for decoding and displaying e.g. compressed JPEG pictures.

4 Claims, 8 Drawing Sheets

(56) References Cited

U.S. PATENT DOCUMENTS

| | | | |
|---|---|---|---|
| 8,144,997 B1* | 3/2012 | Ding | 382/232 |
| 2002/0102026 A1 | 8/2002 | Rijavec et al. | |
| 2003/0077002 A1* | 4/2003 | Silverstein et al. | 382/282 |
| 2003/0158608 A1* | 8/2003 | Ishikawa et al. | 700/2 |
| 2004/0001636 A1* | 1/2004 | Miceli et al. | 382/235 |
| 2004/0095477 A1* | 5/2004 | Maki et al. | 348/222.1 |
| 2006/0067582 A1* | 3/2006 | Bi et al. | 382/233 |
| 2006/0195702 A1* | 8/2006 | Nakamura et al. | 713/190 |
| 2006/0214822 A1* | 9/2006 | Mitchell et al. | 341/50 |
| 2007/0242890 A1* | 10/2007 | Wen et al. | 382/233 |
| 2007/0294245 A1* | 12/2007 | van Baarsen et al. | 707/6 |

FOREIGN PATENT DOCUMENTS

| | | |
|---|---|---|
| EP | 1667460 A2 | 10/2006 |
| WO | 99/34605 A | 7/1999 |
| WO | 99/59343 A | 11/1999 |
| WO | 2005/050567 A | 6/2005 |

* cited by examiner

DECODER FOR SELECTIVELY DECODING PREDETERMINED DATA UNITS FROM A CODED BIT STREAM

FIELD OF THE INVENTION

The invention relates to a decoder and a decoding method for selectively decoding at least one predetermined data unit out of a coded bit stream. Further, it relates to an apparatus having a display with a lower resolution than a picture coded in the coded bit stream.

BACKGROUND OF THE INVENTION

Coding schemes are well known in the art. Coding schemes are used to transform information into a more efficient structure for several purposes. As for example, compression coding schemes are used to minimize the size of data including the information, whereas transport coding schemes are used to increase the differences in the information. Other important purposes could be to optimize energy, to increase the recognition of the information or to increase the robustness against outer influences.

An information bit stream is assembled out of code sequences. A code sequence is a predetermined alignment of data bits, as the most minimum interpretable information unit, to mechanically refer to a denotation of a real circumstance. Normally, in an information bit stream all code sequences comprise a fixed length. Each code sequence represents a data symbol. A data symbol is an interpretable link to the denotation of the real circumstance for a final user or a final using unit. As for example, a single letter of the alphabet as data symbol is an interpretable information for a user. The representation by an unique 8-bit code sequence is the calculation reference for a computer.

To point out the disadvantages of the prior art, the present patent application now describes exemplary entropy coding schemes. However, this should not be taken in a limiting purpose. The problems are also derivable for all other coding schemes.

Due to an unequal occurrence of the code sequences included in the information bit stream, the information bit stream often comprises more data bits than necessary to file the interpretable information. The entropy of a data bit is a value quantifying the interpretable information represented by one data bit in the information bit stream. Accordingly, entropy coding schemes commonly take the advantage of the unequal occurrence of code sequences in the information bit stream, and form new code sequences by reallocating short code sequences to relatively frequently occurring data symbols and long code sequences to relatively occasionally occurring data symbols. With the new code sequences a coded bit stream is assembled increasing the entropy and thus the information content, of the single data bits in the coded bit stream.

Entropy coding schemes are divided into several categories, wherein statistical methods and dictionary methods are best known. Statistical methods only analyze the occurrence of single data symbols in the information bit stream, whereas dictionary methods analyze the occurrence of whole data symbol chains. In addition, run length coding schemes are also well known coding schemes. The principle is to count consecutive occurring data symbols and to indicate only the data symbol itself and the amount of its consecutive occurrence. However, this coding scheme requires an appropriate information bit stream being provided by e.g. picture data.

Other coding schemes take other pre-requirements to assemble a coded bit stream out of a given information bit stream. As for example energy optimizing coding schemes calculate the overall energy of the information bit stream and minimize the overall energy in the new digital bit stream. Accordingly, robustness increasing coding schemes verify the information distance between the single code sequences in the information bit stream and increase the information distance between all possible coding sequences in the coded bit stream. The basic principle of a coding scheme, namely allocating new code sequences to data symbols of an information bit stream is the same, every time.

A conventional decoder reconstructs the information bit stream out of the coded bit stream. Usually, a header added to the beginning of the coded bit stream provides all necessary information to reconstruct the information bit stream and respectively the original code sequences. In case of a conventional entropy decoding scheme, this information comprises at least a coding table for a code bit stream coded by a statistically coding method and a dictionary for a coded bit stream coded by a dictionary based method. That is, prior reconstructing the information bit stream out of a coded bit stream, the conventional entropy decoder reads out information provided by the header of the coded bit stream.

The several data symbols in the information bit stream establish a data unit. A data unit is an interpretable alignment of data symbols, e.g. executable programs, pictures and texts. Usually, an information bit stream comprises a plurality of data units. However, the coded bit stream comprises code sequences of an unequal length such that the conventional decoder is not able to determine the positions of the single data units in the coded bit stream, and the coded bit stream appears as one single data unit first. Therefore, if only one predetermined data unit is needed to be decoded out of the coded bit stream, usually this data unit is not selectable until all data units prior to this data unit are decoded. Therefore, the worst case is that the conventional decoder needs to reconstruct the whole information bit stream before a designated data unit is determinable. Thus, considering all of the involved components within a coded bit stream, the conventional decoder has to handle a huge amount of data and needs a lot of computation steps to reconstruct only one designated data unit. Moreover, the information bit stream must be stored somewhere, increasing the demand on memory. That is, the conventional decoder is extremely time and hardware consumptive in decoding only a few data units out of a coded bit stream comprising a plurality of data units.

A further problem could occur when a data unit is variable in size. That is, the data symbols coded in the coded bit stream keep constant, but the desired data unit is composed of different data symbols in every new decoding step. One known example is when only a section of an image should be displayed. The image section is the data unit to be decoded. It depends on a default value, which might be provided by e.g., a user. In other words, in each time an image section is to be reconstructed out of the coded bit stream, the picture pixels vary as data symbols-vary. Especially in applications with limited memory resources, it is not suitable to store a complete image for selecting only a section of the image.

One solution is to provide a directory in the header of the coded bit stream. Such a directory should store the start points of all data units within the coded bit stream. However, a directory is only reasonable, if the structure of the data units coded in the coded bit stream is manageable in amount and size. In other words, if the coded bit stream comprises a lot of small data units, the directory gets large, such that in case of entropy encoding, no overall compression is achieved at all.

Even worse, the new stream size might exceed the size of the original uncompressed data. Moreover, such a directory is not suitable to all coding schemes. Especially coding schemes used to transmit uncoded data bits as sparse as possible cannot take advantage of a directory, because the directory cannot be encoded.

A popular example for a very large amount of small-sized coded data units in a coded bit stream is the JPEG-format used in the fields of image processing. JPEG is a lossy compression method described by the ISO/IEC 10918 standard. JPEG codes an information bit stream with the aid of different coding and compression tools. This method is a very suitable example to point up the disadvantages of conventional decoders.

A digital picture is a two-dimensional area of pixels. Each pixel is a data symbol representing a color within a color table. The digital picture is therefore an information bit stream with a plurality of data symbols according to the picture pixels. The color table is usually based on the RGB color model, being an additive color model. That means that a color value is assembled by weighting and adding basic colors. In the case of the RGB color model, the basic colors are red, green, and blue. The weighting factor of a basic color is named "color level," hereinafter simply called "level."

To compress information bit streams in an efficient way, most compression standards like JPEG, firstly transforms the colors of the digital picture from the RGB color model into the YCbCr color model. The YCbCr is also an additive color model, wherein a color value is assembled by a luminance component describing the gray scaling of a picture and a red chrominance difference component as well as a blue chrominance difference component describing the red and blue scaling of a picture, wherein the red chrominance and the blue chrominance are color difference signals. That is, the original information bit stream is split up into three information bit streams describing the luminance component, the red chrominance difference component and the blue chrominance difference component of the digital picture.

Secondly, in the most simple way, the red chrominance difference component and the blue chrominance difference component are down-sampled due to the less sensitivity of the human eye against color contours, such that the information bit stream according to the red chrominance and the blue chrominance are transformed accordingly. In case of a mere gray scaled digital picture, this step is omitted.

Thirdly, the digital picture is split up into successional groups of 8×8 pixel blocks. The characteristics of the 8×8 pixel blocks are included in at least one minimum coding units, hereinafter called MCUs. Accordingly, each information bit stream describing the digital picture either in the luminance component, in the red chrominance difference component or in the blue chrominance difference component is divided and allocated such that each information bit stream is divided accordingly into a plurality of 8×8 blocks. In general the corresponding 8×8 blocks of the three components can be either coded interleaved in one MCU or separate into three different, non-interleaved, MCUs.

Figure 1:
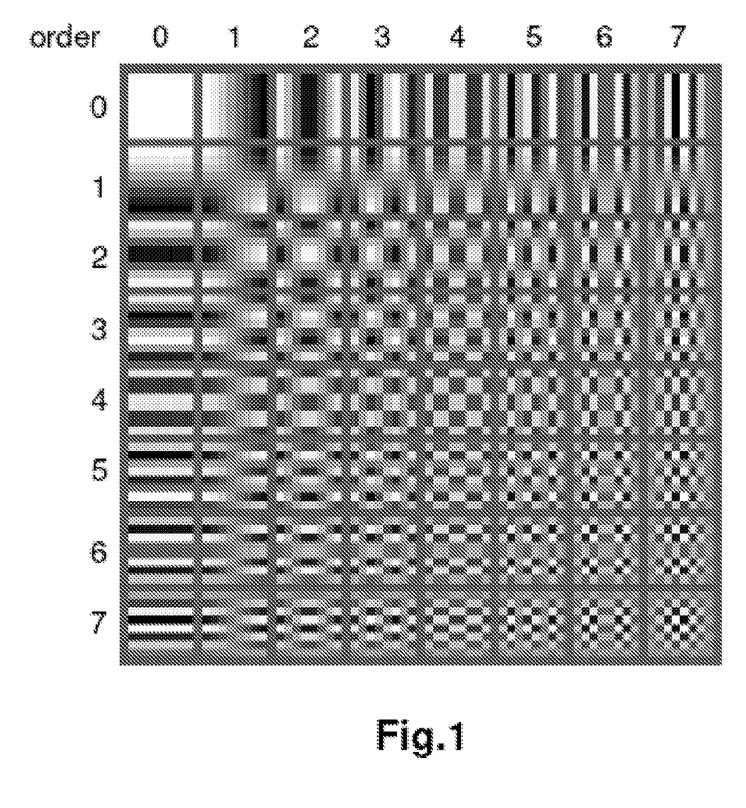
FIG. 1 shows all possible gray scaling basis blocks used to reconstruct the gray part of an 8×8 pixel block in a weighted superposition.

Fourthly, each 8×8 block of an MCU is transformed by a two-dimensional discrete cosine transformation, hereinafter called DCT. Without going deeply into the mathematical background, as a result, the DCT outputs one weighting factor for a constant level basis block, hereinafter called DC-basis block, and 63 weighting factors for 63 varying basis blocks, hereinafter called AC-basis blocks. FIG. 1 shows all possible gray scaling 8×8 basis blocks used to reconstruct the gray part of an 8×8 pixel block in a weighted superposition. The weighting factors outputted by the DCT, hereinafter called DCT-coefficients, allows the DC- and AC-basis blocks to be selectively intensified or weakened, such that each 8×8 block of an MCU could be assembled by a superposition of the DC-basis block and the 63 AC-basis blocks based on the DCT-coefficients. As for the signal processing, the code sequences for each MCU describing the color values in the selected (e.g. YCbCr) color model are replaced by code sequences for each MCU describing the weighting factors of the DCT coefficients. It is important to note that the DC- and AC basis blocks themselves are not the result of the two dimensional cosine transformation, but of the weighting factors. JPEG stores the DCT-coefficient of a DC-basis block differentially in respect to a DC value of a preceding 8×8 block and the DCT-coefficients of the AC-blocks absolutely in the information bit stream.

Fifthly, in a quantization step, all DCT-coefficients needed to describe a 8×8 pixel block of a MCU are sorted, such that the DCT-coefficient belonging to the DC-basis block or slowly varying AC-basis blocks are stored in a consecutive manner. The sorting is performed by a specific scan path, called a ZigZag scan, in a matrix. DCT-coefficients according to the DC-block and to slowly varying AC-blocks are now typically divided by small quantization values. And DCT-coefficients according to strongly varying AC-blocks are typically divided by high quantization values. This division step tracks the basic idea that the human eye is more sensitive to slowly varying frequencies than for to strongly varying frequencies. The quantized DCT-coefficients are rounded to integer numbers. Summarized, a set of quantized DCT-coefficients representing reduced weighting factors for one DC-basis block and 63 AC-basis blocks now define each MCU 8×8 block. That is, the information bit stream originally including color values to describe the digital picture now includes quantized DCT-coefficients. However, until now, only the data symbols, themselves, where transformed into a suitable structure. From now, the data symbols needs to be coded to form a coded bit stream.

Therefore, sixthly, the information bit stream describing the digital picture colors in the selected color model (e.g. YCbCr) are now connected to one information bit stream in such a way, that the code sequences according to the first 8×8 pixel blocks in the upper left position are firstly inserted and the code sequences according to the last 8×8 pixel blocks in the bottom right position are finally inserted. This single information bit stream is entropy and run-length encoded. The quantization of the DCT-coefficients typically generates a lot of data symbols with a level of zero in succession, hereinafter called successive zero levels. The successive zero levels are counted and run length encoded. The result is an intermediate coded bit stream comprising runs and levels. The runs correspond to the amount of successive zero levels replaced at the according position in the intermediate coded bit stream and the levels are the non zero levels at the according position in the intermediate bit stream. Finally, the intermediate coded bit stream is statistically encoded to a coded bit stream to further increase the entropy.

Figure 2:
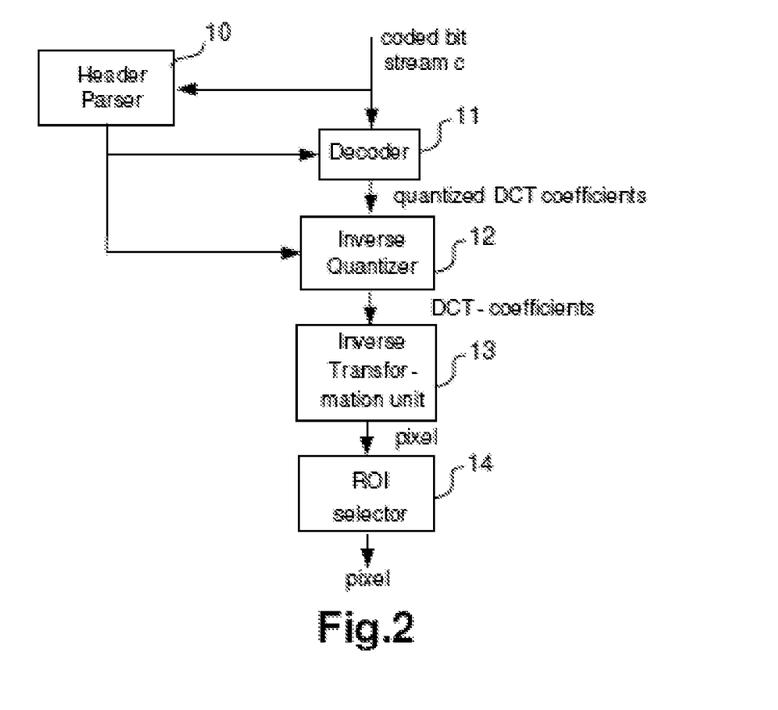
FIG. 2 shows a block diagram of a conventional JPEG decompressor comprising a ROI selector.
Figure 3:
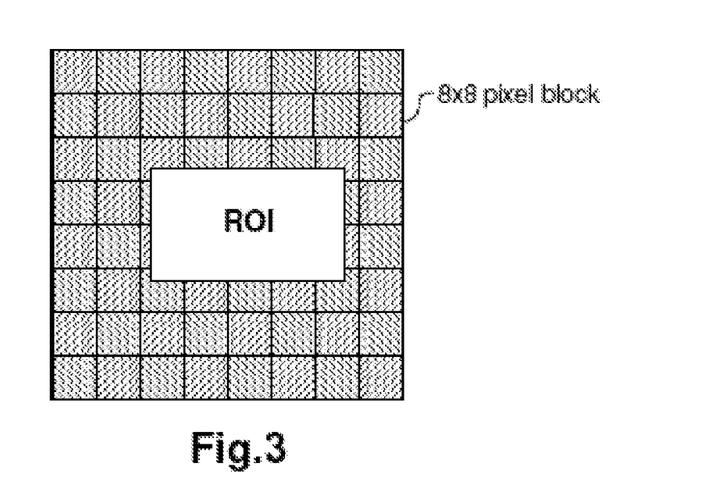
FIG. 3 shows a digital picture with a ROI indicating the necessary pixels for the ROI and the needless pixels not necessary for the ROI within the 8×8 pixel blocks of the digital picture.

FIG. 2 shows a block diagram describing a conventional decompressor reconstructing an information bit stream according to a digital picture compressed and coded by the JPEG-compression method, and FIG. 3 shows an image of a ROI indicating the visual position an digital picture divided by 8×8 pixel blocks.

A coded bit stream c comprising the JPEG-compressed digital picture is received at a header parser 10 and a decoder 11. The header parser 10 reads out a header included in the coded bit stream c to provide information such as the code tables and the quantization values to the decoder 11 as well as to the quantizer 12 to be applied. Next, the decoder 11 decodes the intermediate coded bit stream including the runs and levels generated during the run length coding. As already mentioned, run length coding and statistic encoding are both coding schemes. However, the stress of the present patent application is directed to decoding methods in general, such that it might be more useful to omit one of the coding schemes used during the JPEG-compression. From now, the run-length encoding method is therefore not regarded within the JPEG-compression. This however does not limit the facts of the case. It is irrelevant whether one or a plurality of coding schemes is used. The run length encoding is only omitted for concise purposes and to get the circumstances better understandable. Therefore, the decoder 11 directly outputs an information bit stream DCT' including quantized DCT-coefficients. The information bit stream DCT' including the quantized DCT-coefficients is forwarded to the inverse quantizer 12 multiplying the quantized DCT-coefficients by the respective quantization values to create an information sequence DCT" including multiplied quantized DCT-coefficients. Finally, an inverse transformation unit 13 reads out all multiplied quantized DCT-coefficients from the provided information bit stream DCT" to construct first all MCUs based on the multiplied quantized DCT-coefficients and then the 8×8 pixel blocks. That is, the inverse transforming unit 13 creates an information bit stream including the pixels of a digital picture.

However, many applications aim to display only a section of a digital picture. Such a section is a region-of-interest, hereinafter called ROI. Especially in mobile communication it is a necessity to select ROIs, due to the limited hardware resources of the mobile devices. Recently, there has been a development to provide mobile devices with photo cameras. Photo cameras, themselves, are aimed to provide a high resolution shot photograph. However, the display of a mobile device only provides less resolution. Therefore, the display of an ROI is a suitable way to display a photograph with a higher resolution on a mobile device display.

The conventional decompressor needs to completely reconstruct an information bit stream comprising the pixels of a digital picture. Then, the ROI is selectable by an ROI selector 14. If it is wished to move the ROI through the digital picture, a large amount of data has to be managed, even if the information bit stream comprising the pixels of the digital picture is stored temporarily in a memory. That is, juddering could occur during the movement of the ROI through the digital picture.

A directory in the header of the coded bit stream c indicating the start positions of the single MCUs within the coded bit stream c might be an appropriate way to directly decode the quantized DCT-coefficient out of the information bit stream DCT' needed to display the ROI. However, this is technically useless, as shown in the following example. A YCbCr 4:2:0 VGA-picture with a resolution of 640×480 pixels is divided into 1200 MCUs respectively 9600 8×8 blocks. On the other hand, the resulting coded bit stream c comprises around 500000 bits in case of a common compression rate of 10. In this case, each position in the header requires at least a 19 bit address such that the final directory size of the header extents to around 12 Kilobyte if the start positions of each 8×8 pixel block is indicated. The JPEG-compressed picture itself has a size of around 600 Kilobyte. That is, much more than 2% of the coded bit stream c is consumed for an appropriate directory. Such directory must be stored uncompressed. This means, even if the quality of the JPEG compressed digital picture is reduced to further minimize the size of the coded bit stream c, the directory size keeps constant.

That is, as shown on the example of a JPEG-compressed picture, there is a need to provide an apparatus and a method to decode data units out of a coded bit stream by an arbitrary coding scheme saving memory and resources on the one hand and being able to selectively decode at least one predetermined data unit out of the digital bit stream on the other hand.

OBJECT AND SUMMARY OF THE INVENTION

It is therefore an object of the present invention to provide a method and an arrangement for selectively decoding at least one predetermined data unit out of a coded bit stream without decoding the complete coded bit stream and without providing further information within the coded bit stream in advance.

The object is solved by the features of the independent claims. Advantageous embodiments and developments of the invention are characterized in the dependent claims.

The invention is based in the thought, that a data unit included in the coded bit stream is readily identifiable on predetermined characteristic. It is not needed to reconstruct all data symbols included in the coded bit stream but only these data symbols providing one or more predetermined information about the at least one predetermined data unit and which characterize a predetermined data unit independently from the other data units within the coded bit stream. Therefore, the invention proposes to firstly search and parse information out of the coded bit stream. This information must characterize the data symbols included in the predetermined data unit independently within the coded bit stream. The information might one of the data symbols included in the predetermined data unit or indirect information such as a position of at least one data symbol uniquely identifying the predetermined data unit. Based on this parsed information the predetermined data unit is reconstructable out of the coded bit stream without decoding the complete coded bit stream.

In detail, the inventive arrangement for decoding at least one predetermined data unit out of a coded bit stream comprises a parsing unit and a decoding unit. The parsing unit searches and collects information about the predetermined data unit in the coded bit stream. The collected information is provided to the decoding unit. The decoding unit decodes the predetermined data unit out of the coded bit stream based on the collected information. The inventive arrangement needs not to decode the coded bit stream completely prior selecting a predetermined data unit included in the coded bit stream. The parsing unit searches and extracts necessary information such that the decoder is able to selectively decode the predetermined data unit out of the coded bit stream. There is no need for large header information in the coded bit stream or to completely decode the coded bit stream prior selecting the predetermined data unit. Therefore, a memory will not be loaded with redundant data and the required computation steps performed by the decoding unit and the parsing unit are reduced. Accordingly, memory and computing resources are saved and the predetermined data unit is decoded with less computing time.

A further embodiment of the inventive arrangement additionally comprises a look-up table, in which the parsing unit stores the collected information. Therewith, the decoding unit is able to read out the collected information from the look-up-table. This is especially advantageous for decoding more than one predetermined data unit. With the additionally provided look-up-table, the decoding unit and the parsing unit need not to be synchronized in service. This lowers the hardware requirements to the arrangement and reduces the data traffic accordingly.

In a further preferred embodiment, the functional features of the parsing unit and the decoding unit are provided by the same controller. This saves space and allows to provide an arrangement having less functional units.

In a more detailed application, the coded data stream comprises a compressed picture and the at least one predetermined data unit is a region of interest, hereinafter called ROI. This is especially advantageous in operation because the ROI comprises a plurality of pixels being directly decodable out of the compressed picture now.

In a further preferred embodiment, the received coded data stream or the compressed picture is encoded by a statistic entropy coding scheme based on variable length codes. The usage of a statistic encoding scheme is very advantageous due to the optimal lossless compression efficiency.

In a more detailed application, the compressed picture is a JPEG compressed picture divided into a plurality of minimum coding units, hereinafter called MCU, defining lines and columns in the digital picture. Based on the defined color and subsampling format the MCUs are further decomposed into at least one 8×8 pixel block. Therewith, it is not necessary to decode information about every MCU included in the digital picture, but to parse only information about some suitable MCUs covering the ROI.

In a further preferred embodiment, a specification unit provides a start position in the coded bit stream to the parsing unit instructing to start the search for information about the ROI. The information relates to the position of the ROI within the digital picture. This additionally saves computation time because the needed parsing information is received more quickly.

Preferably, the specification unit further comprises a user interface and a controller. The user interface receives a user input indicating a displacement of the ROI in respect to the start position or an actual position and provides the user input to the controller. Next, the controller calculates a new position of the ROI based on the start position or on the actual position and on the displacement. This arrangement of the specification unit is easy in handling and simple in the construction. It allows a user to move the ROI through the digital picture without storing the complete digital picture in a RAM.

In a further preferred embodiment, the parsing unit comprises a block anchor point determination unit and a DC-block-coefficient determination unit. The anchor point determination unit searches a suitable bit position as anchor point in the coded bit stream characterizing the first MCU of the ROI in each line at least partly comprising the ROI based on the start position provided by the specification unit. Accordingly, the DC-block-coefficient determination unit determines an initial value out of the coded bit stream for each DC-block-coefficient of the first MCU of the ROI in each line at least partly comprising the ROI. These initial values are the information necessary for the decoding unit to selectively decode the ROI. The necessary information only comprises an anchor point and an initial DC-block-coefficient but no AC-block-coefficients being the dominating components of an 8×8 block.

Preferably, the parsing unit further comprises a line anchor point determination unit searching a suitable bit position as anchor point for the first MCU of each line at least partly including the ROI based on the start position, and a line DC-block-coefficient determination unit determining the first DC-block-coefficient of the first MCU of each line at least partly including the ROI. With the information provided by the line anchor point determination unit and the line DC-coefficient determination unit, the anchor point determination unit and the DC-coefficient determination unit start the search for the required information more efficiently by searching in less MCUs, respectively 8×8 pixel blocks, in the JPEG-compressed picture.

Preferably, the decoding unit comprises a predictor component determination unit, a predictor unit and an AC-block-coefficient determination unit. The predictor component determination unit determines a predictor value for the DC-block-coefficients of each MCU at least partly comprising the ROI. The predictor values are provided to the predictor unit. The predictor unit predicts an actual DC-block-coefficient of each MCU based on the predictor value provided by the predictor component determination unit or based on the initial value provided the parsing unit. Further, the AC-block-coefficient determination unit decodes all AC-block-coefficients for each MCU at least partly comprising the ROI based on the first bit position of the first MCU of the ROI in each line at least partly comprising the ROI. Therefore, the decoding unit ignores the MCUs prior the ROI and accordingly saves computation resources, computation time and memory.

A method for decoding at least one predetermined data unit out of a coded stream comprises at least a step of providing a start position in the coded bit stream, a parsing step and a decoding step. The step of providing the start position presets the start position within the coded bit stream. This start position may be selected arbitrarily. Based on the preset start position, the parsing step searches and parses information in respect to the at least one predetermined data unit in the coded bit stream. The decoding step decodes the at least one predetermined data unit out of the coded bit stream based on the parsed information. With this approach, it is not required to completely decode a coded bit stream for selecting subsequently a desired data unit. Accordingly, the amount of computation steps within an appropriate decoding algorithm is reduced, subsequently reducing computation time and requirements to the computation hardware.

An apparatus for selectively displaying a ROI of a JPEG compressed picture using the inventive arrangement to decode at least one predetermined data unit out of a coded bit stream comprises the above described arrangement, an inverse quantizer, an inverse transforming unit, and a output unit including e.g. an image buffer and a display. The coded bit stream comprising the JPEG compressed picture is received by the inventive arrangement selectively decoding all quantized DCT-coefficients corresponding to the MCU necessary to reconstruct the 8×8 pixel blocks at least partly including the ROI. Successively, the inverse quantizer multiplies the quantized DCT-coefficients appropriately. Now, the inverse transforming unit transforms all multiplied quantized DCT-coefficients of the MCUs corresponding to the 8×8 pixel blocks at least partly comprising the ROI and reconstructs the 8×8 pixel blocks from the according MCU. Then, the resulting pixels of the 8×8 pixel blocks are stored into the image buffer. Finally, the display reads out all pixels needed for the ROI and displays the according image. The apparatus comprises an image buffer reduced in size in comparison to the prior art. Further, all components in the apparatus need not to reconstruct the complete JPEG-compressed picture such that the single components have to handle less data traffic and to perform less computation steps. This saves computation time and hardware resources of the apparatus to display the ROI.

The inventive arrangement is suitable for an application in a decompression method comprising at least one decoding step for decoding a data unit out of a variable length coded it stream. These are especially compressed pictures like GIF-compressed pictures, JPEG-compressed pictures, TIFF-compressed pictures and PNG-compressed pictures. But the invention is not limited to such image compressed pictures. It is also applicable for other file formats including compressed data, without having a header including the locations of start points of the single data units.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

Figure 4:
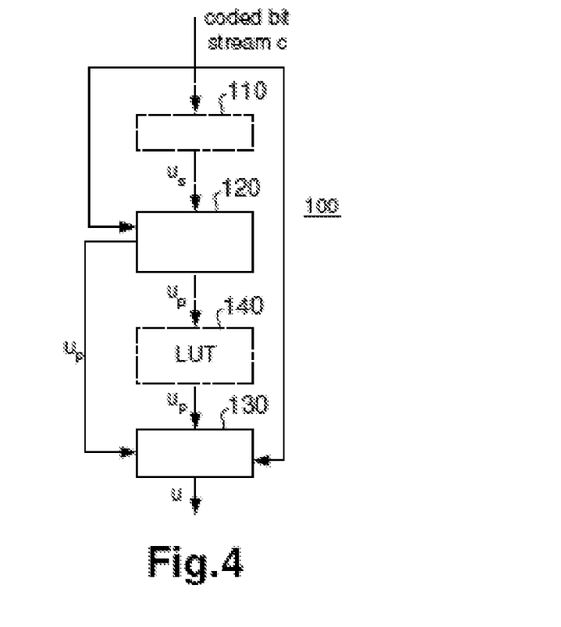
FIG. 4 shows an inventive decoder.

FIG. 4 shows the minimum configuration of an arrangement for selectively decoding at least one predetermined data unit out of a received coded bit stream c without decoding the complete received coded bit stream c and without using a directory provided in the header of the received coded bit stream. For simplification purposes this arrangement is named decoder 100 hereinafter. The elements and connections drawn in bold lines are the indispensable elements of the decoder 100. In detail, these are a parsing unit 120 and a decoding unit 130. The parsing unit 120 starts to search and parse information $u_p$ in respect to the at least one predetermined data unit within the received coded bit stream c. The parsed information could be a bit position of the predetermined data unit within the received coded bit stream c, an appropriate code sequence unambiguously identifying the predetermined data unit or any other appropriate information identifying the predetermined data unit unambiguously within the received coded bit stream c. The parsing unit 120 provides the parsed information $u_p$ to the decoding unit 130 using it to directly jump to the predetermined data unit within the received coded bit stream c and to selectively decode it. The advantage of the decoder 100 is that the parsing unit 120 does not need to completely decode all bits of the bit stream c but only to selectively search information. This might be performed by well identifiable information, as for example the lengths of code words describing the data unit, well repeatedly identifiable code sections in each predetermined data unit in the coded bit stream c or any other appropriated information in the coded bit stream c.

Figure 8:
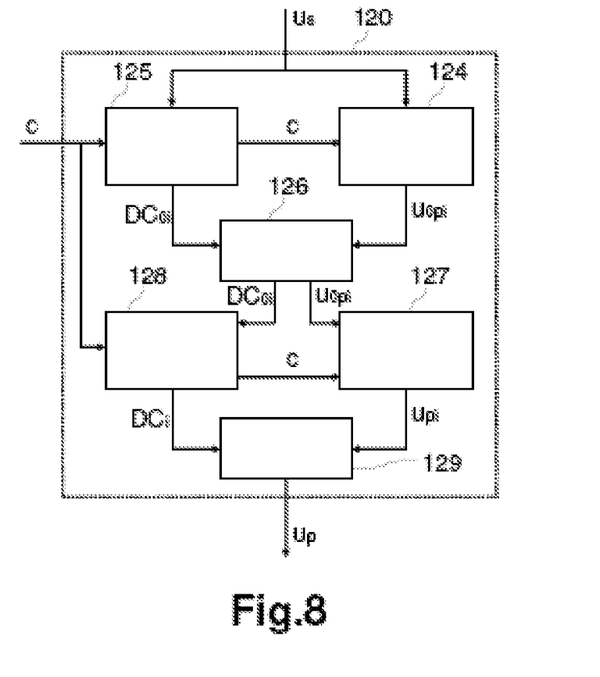
FIG. 8 shows a block diagram of a parsing unit according to a second embodiment.
Figure 9:
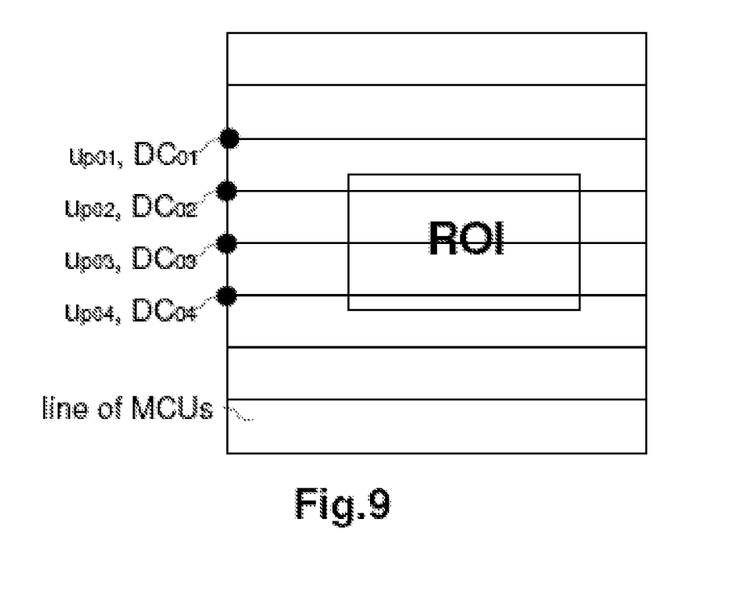
FIG. 9 shows a line-wise divided coded image with a ROI illustrating one searching and parsing step of the parsing unit according to a second embodiment.

Preferably, the specification unit 110 is connected to the decoding unit 130 to provide the start position $u_s$ indicating a start point in the Look Up Table 140 where the decoding unit 130 might start with the decoding process for the ROI reconstruction (not illustrated). Therewith, the specification of the start position $u_s$ gets independent from the coded bit stream c. In a second embodiment, the line based method as shown in FIGS. 8 and 9 the specification unit 110 is additionally connected to the parsing unit 120 to provide the start position of the MCU line within the coded bit stream c. The parsing unit 120 will use this start position to parse the coded bit stream c until it detects the MCU contributing to the ROI. This detected position will then be used by the decoding unit 130 to decode and reconstruct the ROI itself.

A further preferred embodiment of the decoder 100 comprises a look-up table 140, hereinafter called LUT. The LUT stores the parsed information $u_p$ and provides it to the decoding unit 130. Therewith, LUT 140 firstly collects parsed information $u_p$ about all or a part of the predetermined data units to be decoded, such that the decoding unit 130 needs not to decode the predetermined data units immediately after the parsing unit 120 has outputted the parsed information $u_p$. That is, the LUT 140 works as reference, such that the parsed information $u_p$ needs to be parsed only one time, even in case of a user interaction, and reduces therefore the data traffic and the system workload.

In particular, it is appropriate to realize the functional features of the parsing unit 120 and the decoding unit 130 by one single controller, because in many applications of the decoder 100, the functional features of the parsing unit 120 are a subset of the functional features provided by the decoding unit 130. That is, a realization could be easily reached by suppressing not needed functional features when performing the tasks of the parsing unit 120, such that the controller firstly collects the parsed information $u_p$ out of the received coded bit stream c and then decodes the predetermined data units respectively. Such an embodiment saves additional space, memory, and hardware resources.

The decoder 100 is especially effective in case of data encoded by a variable length coding methods. Mere code schemes such as the Golomb Code or the Tunstall Code or complete statistical encoding methods such as the Huffman Coding or the Shannon-Fano Coding are appropriate and could be handled by the decoder 100. Characteristic for statistically encoded data is that symbols are coded by variable length codes. That is, there is no way, to calculate a position of a designated predetermined data unit in advance.

Preferably, the decoder 100 is employed to decode coded digital pictures. Especially, displays used in mobile communication or other portable devices comprise only a weak resolution being usually much smaller than the resolution of a received coded picture, which recorded by an integrated camera of the mobile device. In such applications, it has been pointed out, that a display of only a digital picture section on the screen is the best solution for manually moving the digital picture section within the whole digital picture by a user. Therefore, the application of the present invention for decoding a section of a coded digital picture in the received coded bit stream c will be explained in more detail in the following. Such a section of the digital picture is named region of interest, hereinafter called ROI.

The decoder 100 will be now described on the example of JPEG compressed pictures in detail. That is, the compressed and coded digital picture is a JPEG compressed pictures, which is divided into cells or minimum coding units, hereinafter called MCU, respectively sets of 8×8 pixel blocks. The MCUs generate a plurality of lines and columns in the digital picture. The exact composition of a MCU into blocks depends on the color and subsampling format. That is, in a merely gray-scaled picture, the 8×8 pixel block is described by only one minimum coding unit. Accordingly, for color pictures an interleaved minimum coding unit describes the three different color portions of the YCbCr color model and contains therefore multiple 8×8 blocks. A YCbCr4:2:0 MCU for example contains six 8×8 blocks in total, four Y 8×8 blocks, one Cb 8×8 block and one Cr 8×8 block. Summarized, the decoder 100 takes advantage of the facts that it is only necessary to decode these 8×8 pixel blocks out of the JPEG-compressed picture, which at least partly includes the ROI. Accordingly, the decoder needs to decode all MCUs necessary to reconstruct the 8×8 pixel blocks at least partly including the ROI. In other words, from now, the JPEG-compressed picture is the received coded bit stream c in detail and the MCUs of the 8×8 pixel blocks are the predetermined data units to be decoded.

Figure 5:
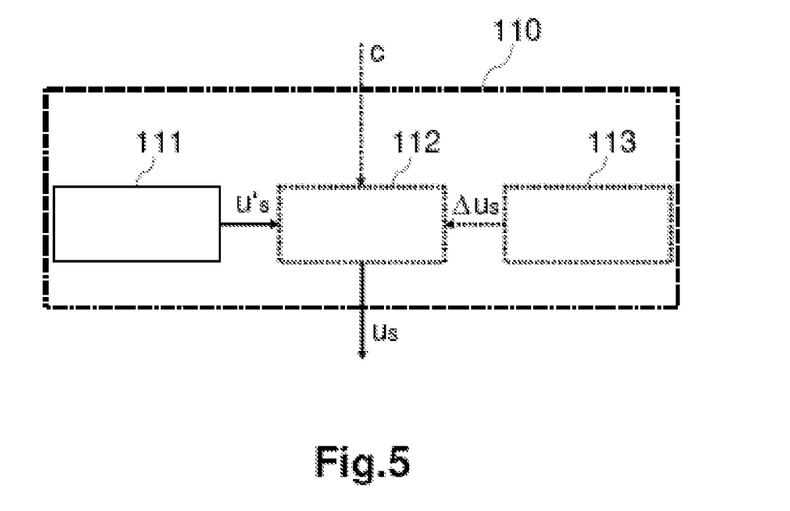
FIG. 5 shows a block diagram of an embodiment of the specification unit.

FIG. 5 shows a block diagram of an exemplary specification unit 110. Therein, a memory 111 provides a start position $u'_s$ as a default position being equal to the start position $u_s$. However, preferably, the specification unit 110 further comprises a controller 112 and a user interface 113. The user interface 113 is adapted to receive an user input indicating a displacement $\Delta u_s$ of the ROI in the JPEG-compressed picture relatively to the start position $u_s$ provided by the memory 111. A controller 112 receives the start position $u_s$ or the actual position and the displacement $\Delta u_s$ and calculates based on these both values, the next start position $u_s$. Hereinafter, the controller 112 sets the calculated start position $u_s$ as new start position $u'_s$ in the memory 111. The new start position $u'_s$ may be permanently or only actually stored for the present application. That enables an user to move the ROI within the JPEG-compressed picture, wherein the specification unit 110 always provides an up-to-date arbitrary position $u_s$. Therewith, parsing unit 120 needs not to start the search for the parsed information $u_p$ always from the same bit position but can start at a bit position being close to the parsed information $u_p$ shorting searching steps and therewith computation time and hardware resources.

Figure 6:
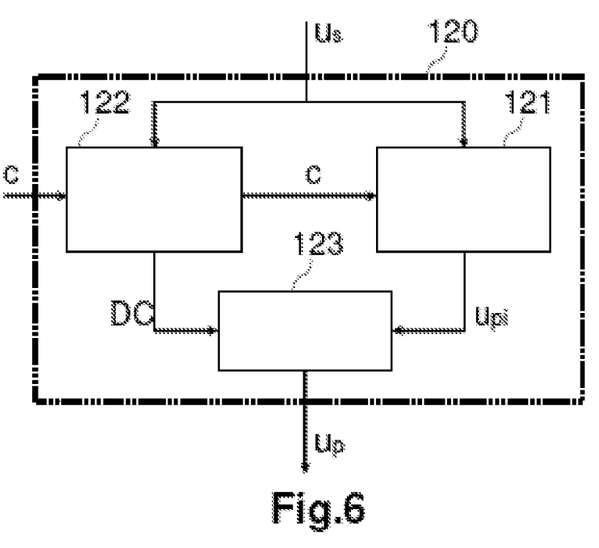
FIG. 6 shows a block diagram of a parsing unit according to a first embodiment.
Figure 7:
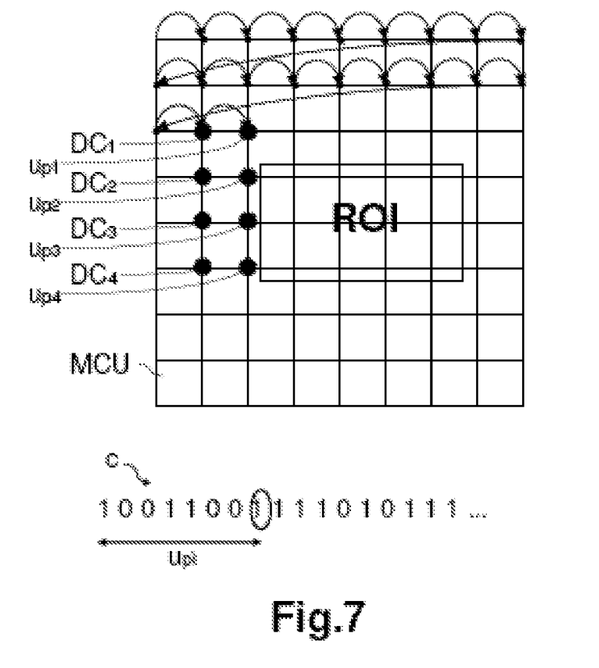
FIG. 7 shows a block-wise divided coded image with a ROI illustrating the searching and parsing procedure performed by the parsing unit according to a first embodiment.

FIG. 6 shows a block diagram of a parsing unit 120 according to a first embodiment and FIG. 7 shows a block-wise divided coded image with a ROI illustrating the searching and parsing procedure performed by the parsing unit 120 according to a first embodiment. The parsing unit 120 receives the start position $u_s$ from the specification unit 110 and provides it to an anchor point determination unit 121 and a DC-block-coefficient determination unit 122. The anchor point determination unit 121 receives the JPEG-compressed picture also and searches therein for bit positions of the first bits of each first MCU of the ROI in the lines at least partly including the ROI. Simultaneously, the DC-block-coefficient determination unit 122 starts at the first bit position of the JPEG-compressed picture and reconstructs the DC-block-coefficients DC, of all start MCUs of the ROI in the lines at least partly including the ROI. In detail, each decoded DC-block-coefficient represents a differential coded value and has to be added to the preceding reconstructed DC value, also known as predictor. Finally, the determined bit positions and the determined DC-block-coefficients $DC_i$ are preferably provided to a multiplexer 123 assembling the parsed information $u_p$. The parsed information up might now be stored in the LUT 140.

Figure 10:
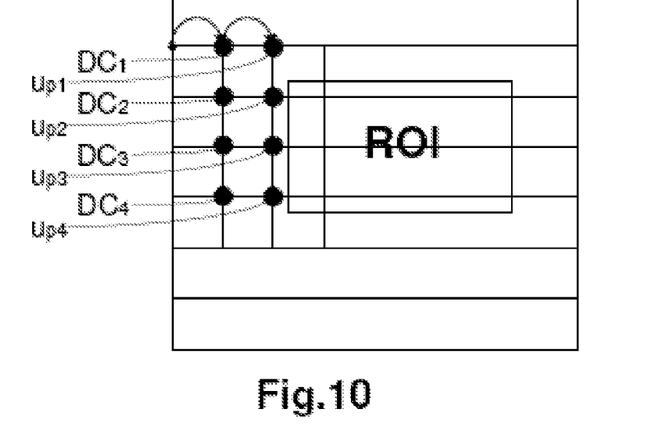
FIG. 10 shows a line-wise divided coded image with a ROI illustrating a further searching and parsing step of the parsing unit according to a second embodiment.
Figure 11:
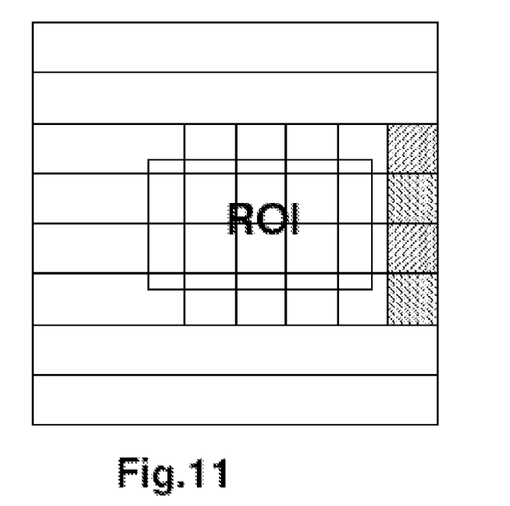
FIG. 11 shows a line-wise divided coded image with a ROI indicating the 8×8 pixel blocks, not needed to be taken into account at all.
Figure 12:
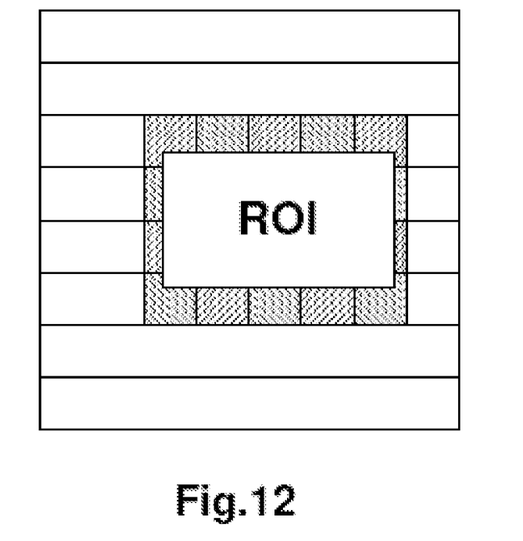
FIG. 12 shows a line-wise divided coded image with a ROI indicating the 8×8 pixel blocks necessary to be determined for decoding and reconstructing the ROI.

FIG. 8 shows a block diagram of a parsing unit 120 according to the second embodiment. FIG. 9 shows a line-wise divided coded image with an ROI illustrating one searching and parsing step of the parsing unit 120 according to the second embodiment. FIG. 10 shows a line-wise divided coded image with an ROI, illustrating a further searching and parsing step of the parsing unit 120, according to the second embodiment. FIG. 11 shows a line-wise divided coded image with an ROI indicating that the 8×8 pixel blocks are not needed to be taken into account by the parsing unit, according to the second embodiment. And FIG. 12 shows a line-wise divided coded image with an ROI, indicating the 8×8 pixel blocks that are necessary to be determined for the ROI.

According to FIG. 8, the parsing unit 120, according to the second embodiment, comprises a line anchor point determination unit 124, a line DC-block-coefficient determination unit 125, a look-up table 126, an anchor point determination unit 127, and a DC-block-coefficient determination unit 128.

The line anchor point determination unit 124 determines the bit positions $u_{0pi}$ of the first bits of each line at least partly including the ROI. Accordingly, the line DC-block-coefficient determination unit 125 determines the DC-block-coefficients $DC_{0i}$ of the first 8×8 block included in the first MCU of each line at least partly comprising the ROI. The bit positions $u_{0pi}$ of the first bit of each line and the DC-block-coefficient $DC_{0i}$ of each first 8×8 block of each line at least partly comprising the ROI are now stored in the look-up table 126 connected to the DC-block-coefficient determination unit 128 and the anchor point determination unit 127. The differences between the DC-block-coefficient determination unit 122 and the anchor point determination unit 121 of the parsing unit 120, according to the first embodiment, are, in detail, the usage of the stored bit positions $u_{0pi}$ of each first bit of each line at least partly comprising the ROI, and the usage of the DC-block-coefficients $DC_{0i}$ of each MCU included in the first 8×8 pixel block of each line at least partly comprising the ROI. In other words, both units 127 and 128 do not start from the beginning of the JPEG-compressed picture but from the values $u_{p0i}$ and $DC_{0i}$ stored in the look-up-table 126 to determine the DC-block-coefficients $DC_i$ of all blocks belonging to the first MCUs in the ROI of the lines at least partly including the ROI, and to determine the bit positions of the first MCU in the ROI of the lines at least partly including the ROI. The DC-block-coefficients $DC_i$ and the bit positions $u_p$ are optionally provided to a multiplexer 129 to form a unitary signal including the parsed information $u_p$. This embodiment is especially advantageous because the 8×8 blocks of the MCUs behind the ROI, as shown in FIG. 10, need not be processed, saving computation time, memory, and hardware resources. That is, indeed the second exemplary parsing unit 120 is complex in configuration, but the ROI and, accordingly, the picture to be displayed as shown in FIG. 11, is decoded with less computation time and memory.

Figure 13:
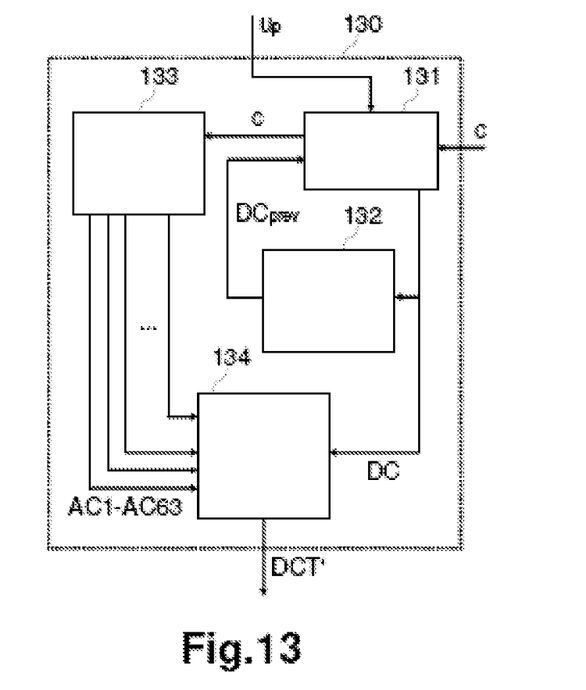
FIG. 13 shows a block diagram of an embodiment of a decoding unit according to the invention.

FIG. 13 shows an exemplary decoding unit 130. The decoding unit 130 reconstructs all DCT-coefficients necessary to reconstruct each 8×8 block of the MCUs used to display the ROI. The exemplary decoding unit 130 comprises a predictor unit 131, a predictor component determination unit 132, and an AC-block-coefficient determination unit 133. The predictor unit 131 predicts a DC-block-coefficient DC for the actual 8×8 block based on a DC-block-coefficient of a preceding 8×8 block, or the parsed information $u_p$. That is, the necessary predictor value could be received from the parsing unit 120, from the look-up table 140, or from the predictor component determination unit 132. In the most simple way, the predictor component determination unit 132 only buffers the actual DC-block-coefficient DC calculated by the predictor unit 131. Simultaneously, the AC-block-coefficient determination unit 133 directly determines the AC-block-coefficients AC1 to AC63 according to the actual 8×8 block. That is, due to the provided parsed information $u_p$, the exemplary decoding unit 120 directly jumps to the bit positions including the start of the 8×8 blocks including the ROI. In other words, the exemplary decoding unit 120 decodes only these DC-block- and AC-block-coefficients $DC_0$ and AC1-AC63 necessary to reconstruct the MCUs at least partly comprising the ROI.

The arrangement of the decoder 100 effects a subdivision of decoding procedure. In detail, firstly, the decoder 100 analyzes a coded bit stream and parses important data out of the coded bit stream to directly decode a predetermined data unit. As a result of this subdivision effect, the decoder could directly decode the predetermined data unit without decoding other data units not intended to be displayed. Therefore, the amount of computation steps is reduced such that the predetermined data unit could be decoded more quickly.

If the predetermined data unit is assembled out of a plurality of distributed code fragments in the coded bit stream, a look-up-table could be provided to collect and store the parsed information prior the decoding process. Therewith, the parsing unit 120 operates independently from the decoding unit 130, such that additional computation steps are saved resulting in further time saving. Moreover, the autonomous operation of the parsing unit 120 in respect to the decoding unit 130 reduces the signaling traffic in the decoder 100.

If the coded bit stream is a compressed and coded digital picture and the predetermined data unit is a section of the digital picture or a region of interest, hereinafter called ROI, to be displayed, the decoder 100 only decodes the pixels belonging to the ROI of the digital picture. In case of a JPEG-compressed digital picture, the decoder selectively decodes all MCUs at least partly including the ROI. In other words, the decoder 100 needs not to decode all MCUs included in the digital picture, but only these MCUs necessary including the pixels to display the ROI.

Further, a user could move the ROI within the digital picture without the need for decoding the complete digital picture. The decoder 100 only decodes the MCUs or pixels additional being necessary to display the ROI and discards the MCUs or pixels dropping out for the display of the ROI. This effectively reduces the required memory. The decoder 100 does not generate any data loss during the decoding process of the predetermined data unit or the ROI.

The decoder 100 performs a method to decode a predetermined data unit out of a coded bit stream c comprising the following steps. Firstly, the received coded bit stream c is provided to at least the parsing unit 120 and the decoding unit 130. Next, the specification unit 110 provides a start position $u_s$ within the coded bit stream c as start point for the parsing unit 120 to search determined information characterizing the predetermined data units uniquely. When the parsing unit 120 finds and parses the predetermined information, it will either be stored in the look-up table 140 or directly provided to the decoding unit 130 as parsed information $u_p$. If the decoding unit 130 directly receives the parsed information $u_p$, the predetermined data unit is decoded directly out of the coded bit stream c. Otherwise, the decoding unit 130 accesses the look-up-table 140 prior decoding. Finally, the symbols according to the predetermined data units are output as a symbol stream u.

Figure 14:
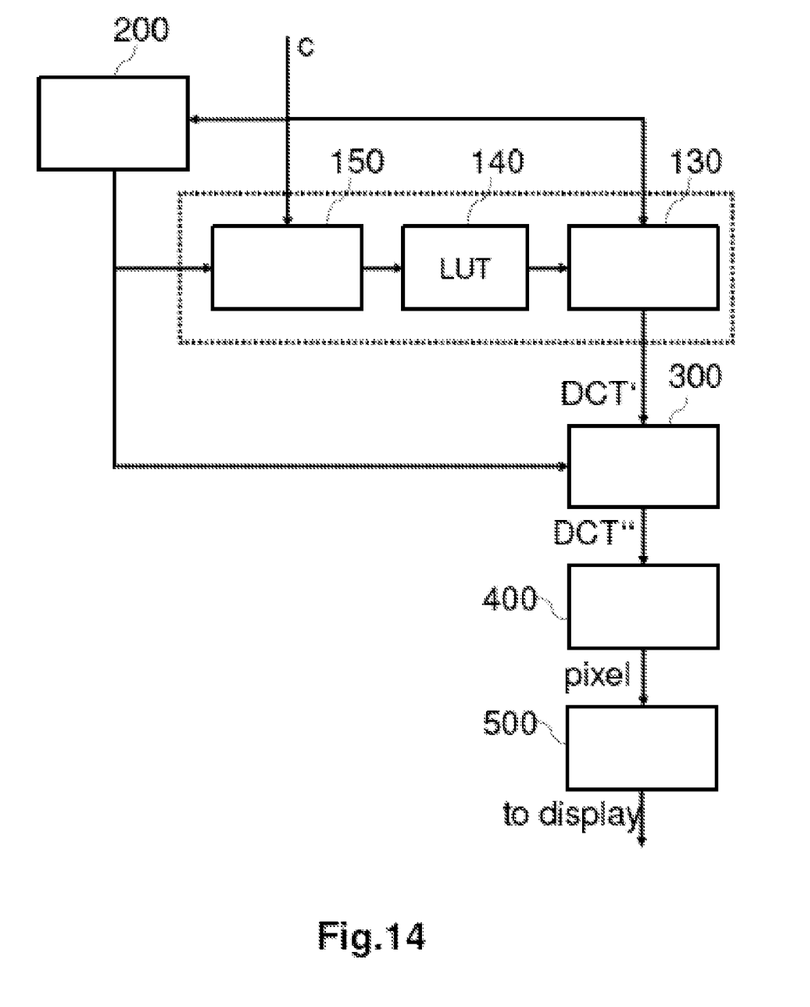
FIG. 14 shows a block diagram of a JPEG decompressor utilizing the inventive decoder.

FIG. 14 shows the decoder 100 within an apparatus for displaying a region of interest, hereinafter called ROI, of a JPEG compressed picture. The arrangement in FIG. 14 comprises a quick decoding unit 150, the look-up table 140 and the decoding unit 130. The quick decoding unit 150 includes the specification unit 110 and the parsing unit 120 (not illustrated). It receives the JPEG-compressed picture as coded bit stream c and information about the JPEG compressed picture from a header parser 200. The quick decoding unit 150 provides the position of the first bits and the DC values of first the 8×8 block of the first MCUs in each line at least partly comprising the ROI and stores it in the look-up table 140. Now, the decoding unit 130 decodes all DCT-coefficients of all MCUs comprised in the ROI and provides it to an inverse quantizer 300. The inverse quantizer 300 multiplies the DCT-coefficients by appropriate values, which are received from the header parser 200. The resulting multiplied quantized DCT-coefficients are used to weight the DC- and AC-coefficients respectively and super-pose them to reconstruct the single 8×8 block at least partly included in the ROI. The involved 8×8 pixel blocks are combined to form the reconstructed MCUs. The component values of the 8×8 pixel blocks are output by the inverse transforming unit 400 and stored in an image buffer 500. Now, a display may read out the buffered pixels from the image buffer 500 to display the ROI.

In comparison with the prior art, the apparatus for displaying a ROI needs not necessary to decode a complete JPEG-compressed picture. Therewith, the image buffer needs not to be design as large as in the prior art.

Finally, the inverse quantizer and inverse transforming unit needs not to reconstruct a complete picture such that computation time is saved and the hardware loading is reduced.

The invention claimed is:

1. An apparatus for decoding a region of interest (ROI) out of a coded bit stream representing a JPEG compressed image, without completely decoding the coded bit stream and without a need to insert pointers into the coded bit stream, comprising:

a multiplexer, having first and second inputs and an output a specification unit to receive a start position of the JPEG compressed image in the coded bit stream and a user specified displacement of the ROI to produce a new start position therefrom;

a first anchor point determination unit to receive the JPEG compressed image and the new start position, the JPEG compressed image divided into a plurality of minimum coding units (MCUs) defining lines, to determine bit positions of the first bit of lines at least partly including the ROI;

a first DC-block-coefficient unit to receive the compressed image and the new start position and to determine DC-block-coefficients of the first block included in the first MCU of each line at least partly comprising the ROI simultaneously with the determination of the bit positions by the first anchor point determination unit;

a look up table for receiving the output of the first DC-block-coefficient unit and the bit positions of the first bit of each line at least partly including the ROI and for storing the DC-block-coefficient;

a second anchor point determination unit to retrieve the first bit positions of the first bit of each line at least partly including the ROI stored in the look-up-table and to provide bit positions of MCUs in the ROI of the lines at least partly including the ROI to the first input of the multiplexer;

a second DC-block-coefficient unit to receive the DC-block-coefficients of the ROI stored in the look-uptable and to provide DC-block-coefficients of blocks belonging to the MCUs in the ROI of the lines at least partly including the ROI to the second input to the multiplexer; and a decoder for reconstructing all DCT-coefficients necessary to reconstruct each block of the MCUs used in the ROI based on the output of the multiplexer.

2. The apparatus of claim 1, wherein the JPEG-compressed picture is divided into minimum coded units (MCUs), wherein the MCUs each comprise 8×8 pixel blocks, and wherein the ROI includes a plurality of said MCUs.

3. The apparatus of claim 2, wherein the decoder comprises:
   a predictor component determination unit adapted to calculate a predicted DC-coefficient based on preceding DC-coefficients;
   a predictor unit adapted to reconstruct the DC-coefficients of each MCU at least partly comprising the ROI based on the predicted DC-coefficient provided by the predictor component determination unit or on a DC-coefficient provided by the parsing unit and on a differential value for the DC-coefficient reconstructed from the coded bit stream; and
   an AC-block-coefficient-determination unit adapted to determine orthogonal transformation coefficients of each MCU at least partly comprising the ROI out of the coded bit stream.

4. A method of decoding a predetermined data unit out of a coded bit stream, the coded bit stream representing a JPEG compressed image, without completely decoding the coded bit stream and without a need to insert pointers into the coded bit stream, comprising:

producing a new start position in the coded bit stream from a received start position of the JPEG compressed image in the coded bit stream and a user specified displacement of a region of interest (ROI);

receiving in a first DC-block-coefficient unit, the JPEG compressed image and the new start position, the JPEG compressed image divided into a plurality of minimum coding units (MCUs) defining lines and determining the bit positions of the first bit of lines at least partly including the ROI;

determining DC-block-coefficients of the first block included in the first MCU of each line at least partly comprising the ROI simultaneously with the determination of the bit positions of the first bit of lines at least partly including the ROI and storing said coefficients and bit positions of the first bit of lines at least partly including the ROI in a look-up-table;

retrieving the first bit positions of the first bit of each line at least partly including the ROI stored in the look-up-table and providing bit positions of MCUs in the ROI of the lines at least partly including the ROI to a first input of a multiplexer;

receiving in a second DC-block-coefficient unit, the DC-block-coefficients of the ROI stored in the look-up-table and providing DC-block-coefficients of blocks belonging to the MCUs in the ROI of the lines at least partly including the ROI to a second input to the multiplexer;

reconstructing all DCT-coefficients necessary to reconstruct each block of the MCUs used in the ROI based on an output of the multiplexer.

* * * * *